United States Patent [19]

Ozaki

[11] Patent Number: 4,853,783
[45] Date of Patent: Aug. 1, 1989

[54] VIDEO SIGNAL PROCESSING CIRCUIT
[75] Inventor: Hidetoshi Ozaki, Chofu, Japan
[73] Assignee: Victor Company of Japan, Ltd., Yokohama, Japan
[21] Appl. No.: 96,997
[22] Filed: Sep. 16, 1987
[30] Foreign Application Priority Data Sep. 16, 1986 [JP] Japan .................................. 61-217839
Sep. 16, 1986 [JP] Japan .................................. 61-217840

[51] Int. Cl.⁴ ............................................... H04N 5/14
[52] U.S. Cl. ...................................... 358/162; 358/166
[58] Field of Search ............... 358/162, 166, 167, 284, 358/96, 169, 160, 170

[56] References Cited
U.S. PATENT DOCUMENTS 3,878,323 4/1975 Fisher ................................... 358/160
4,541,014 9/1985 Yagi ...................................... 358/162

Primary Examiner—James J. Groody
Assistant Examiner—David E. Harvey
Attorney, Agent, or Firm—Fleit, Jacobson, Cohn, Price, Holman & Stern

[57] ABSTRACT

A video signal processing circuit for aperture correction or picture restoration having a high frequency range emphasis filter which provides a signal whose high frequency range emphasized, a plurality of delay circuits connected serially which output signals having different delay times and a selector which effects level comparison among the input signal the output signals with delays and which supplies the maximum or minimum of them to a first limiter as its threshold level and the minimum or maximum of them to a second limiter as its threshold level. The first limiter limits the high frequency range emphasized signal and the second limiter limits the output signal of the first limiter. A high frequency component extraction circuit and a noise suppressor which suppress noise in high frequency component and adder which adds together the output of the second limiter and the output of the noise suppressor may be used.

3 Claims, 16 Drawing Sheets

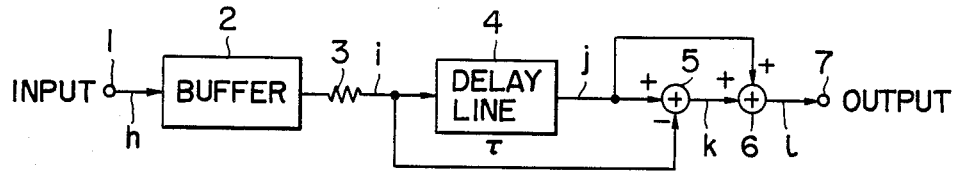
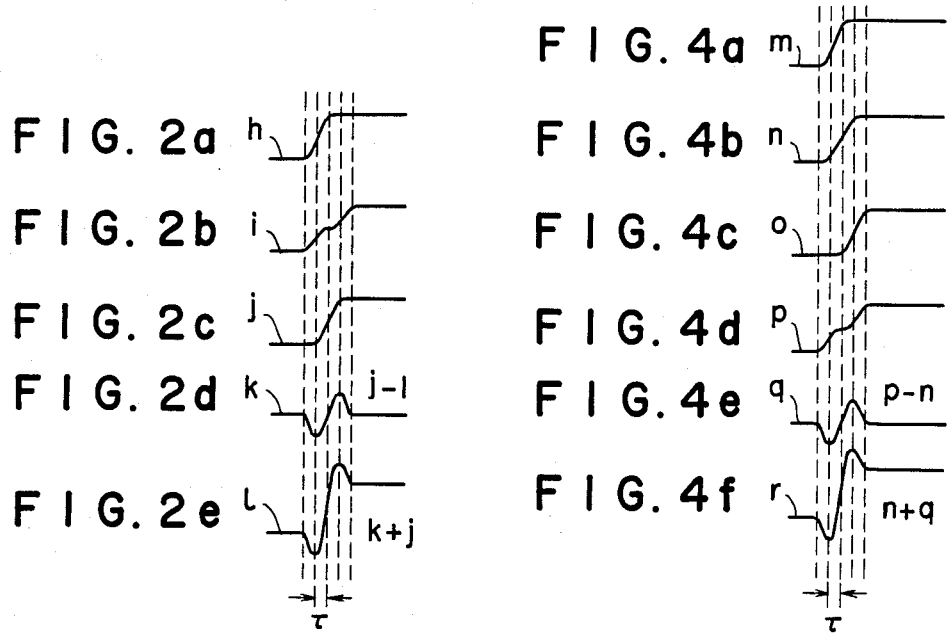
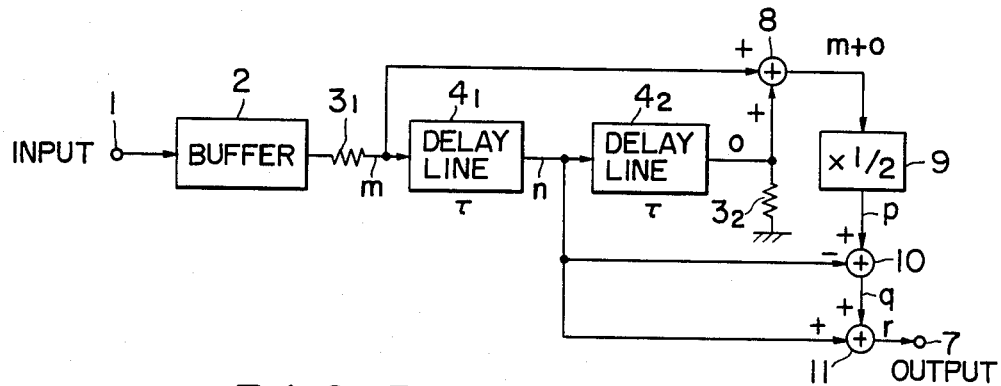
FIG. 1 PRIOR ART
FIG. 3 PRIOR ART

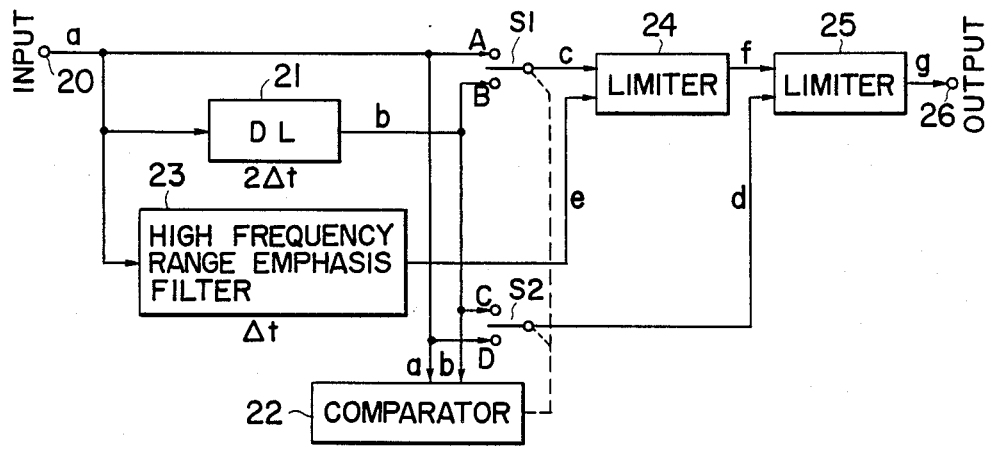
FIG. 8
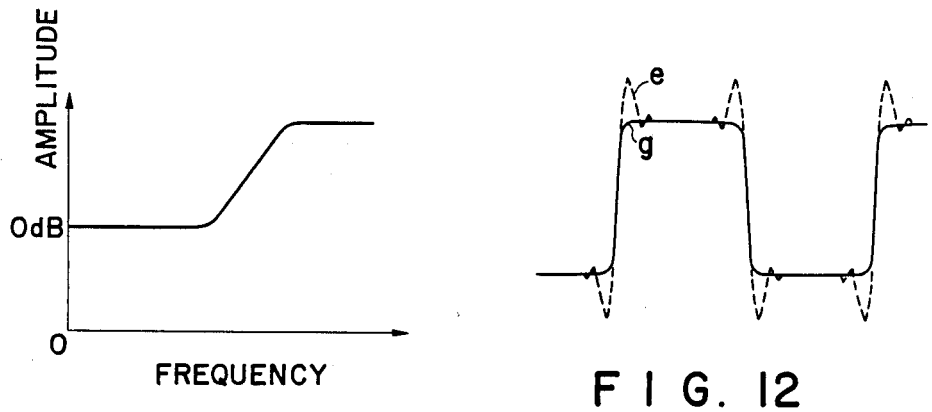
FIG. 10
FIG. 12
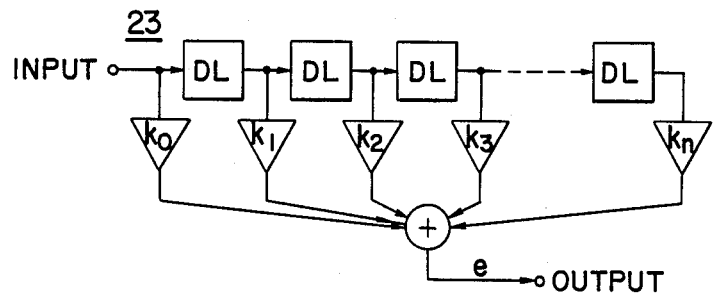
FIG. 11

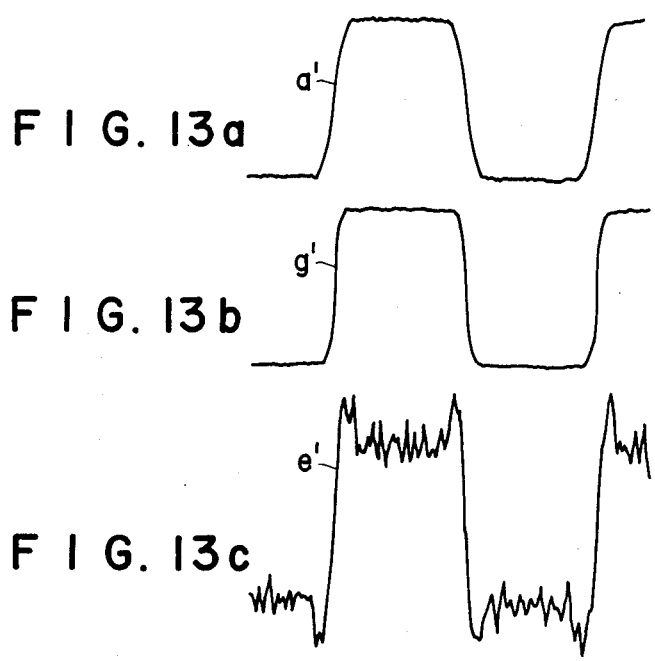
FIG. 13a
FIG. 13b
FIG. 13c
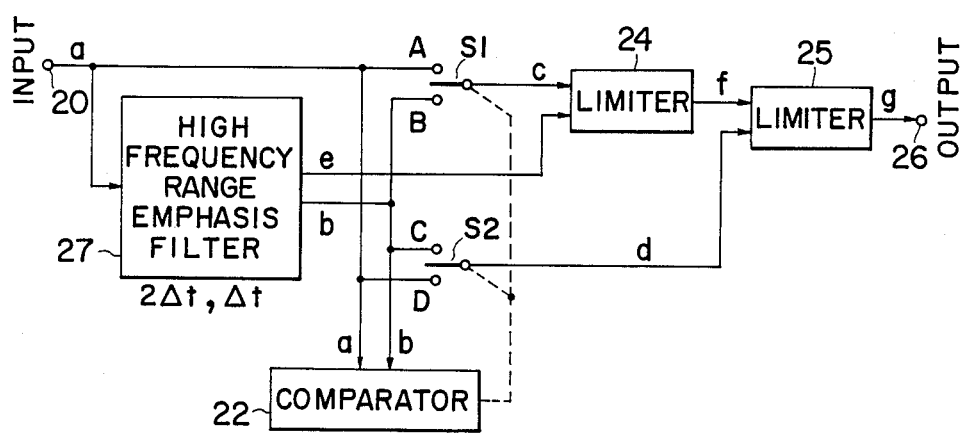
FIG. 14

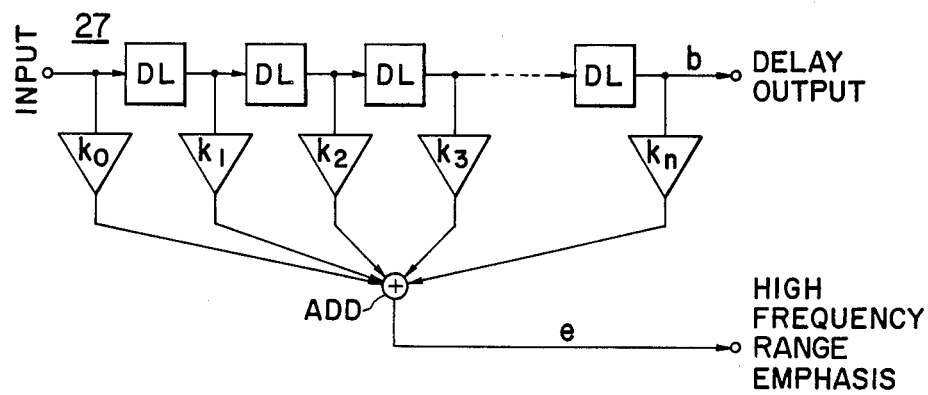
F I G. 15
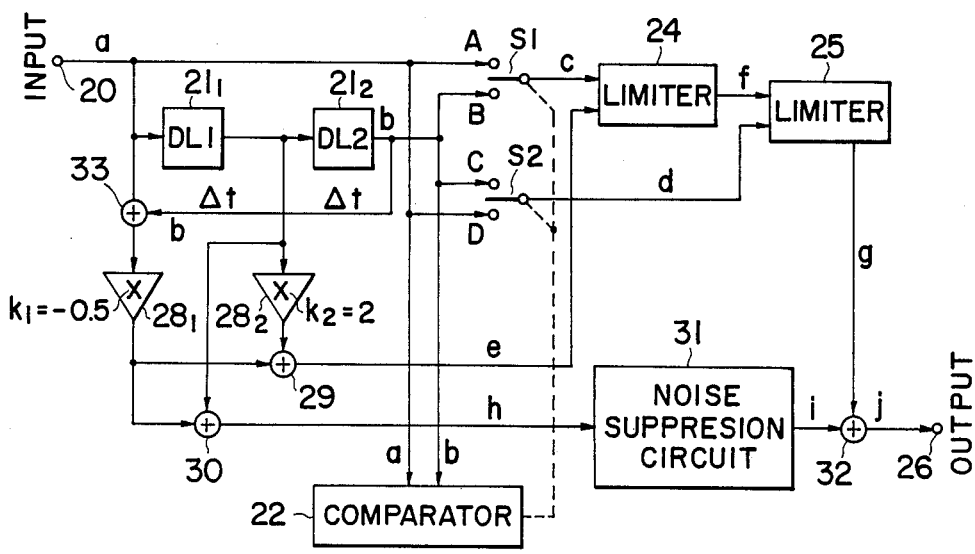
F I G. 17

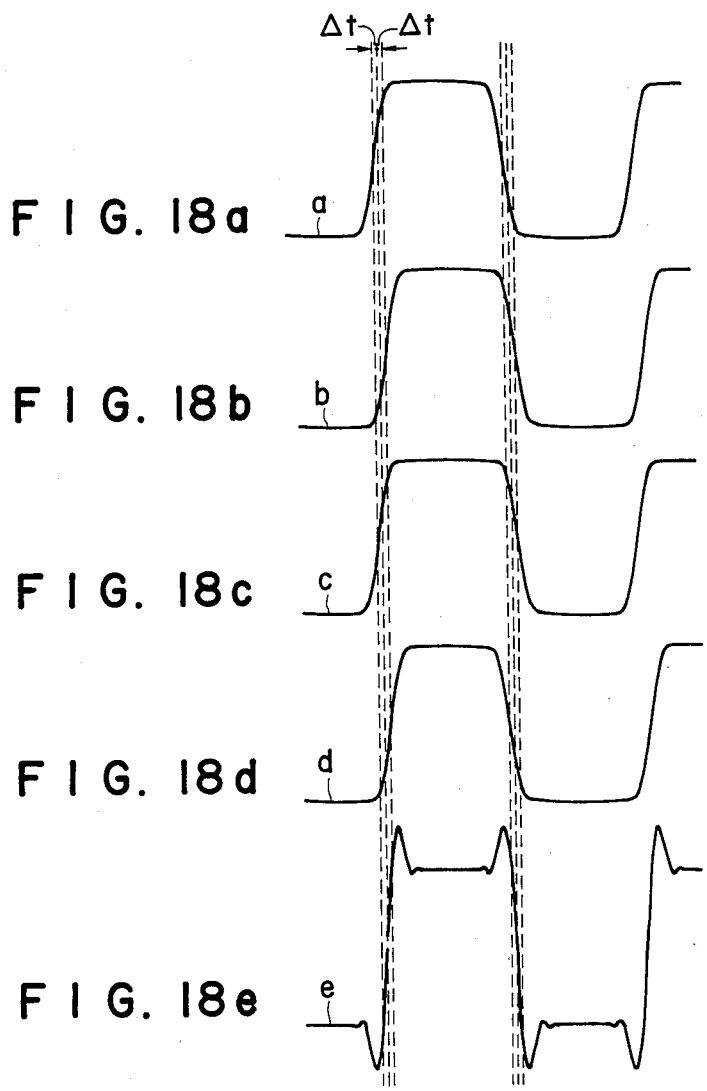

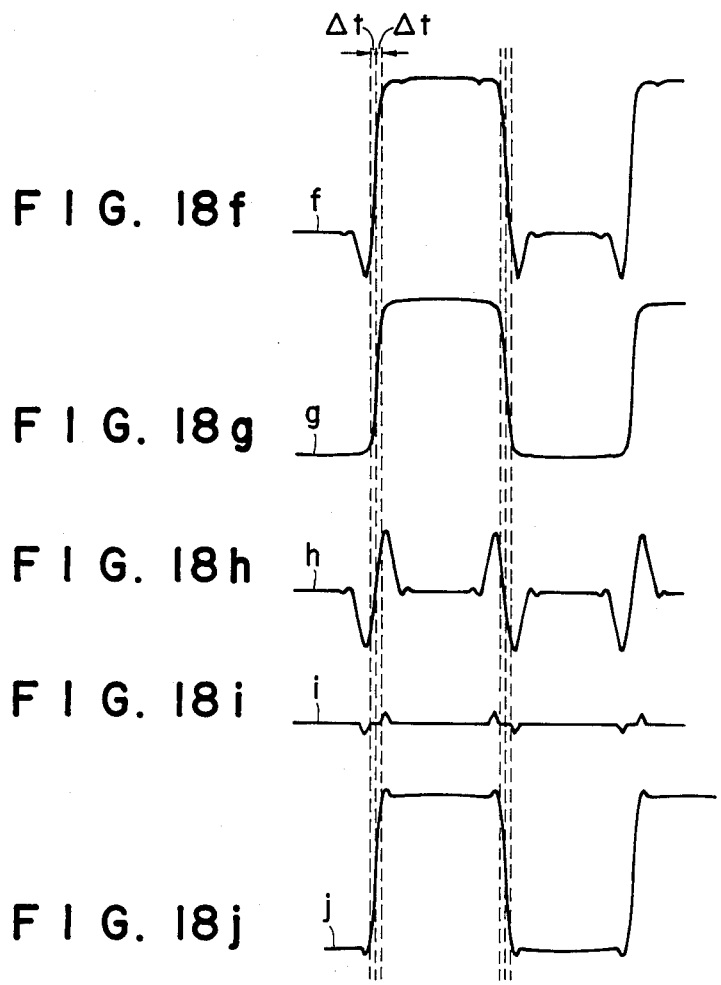

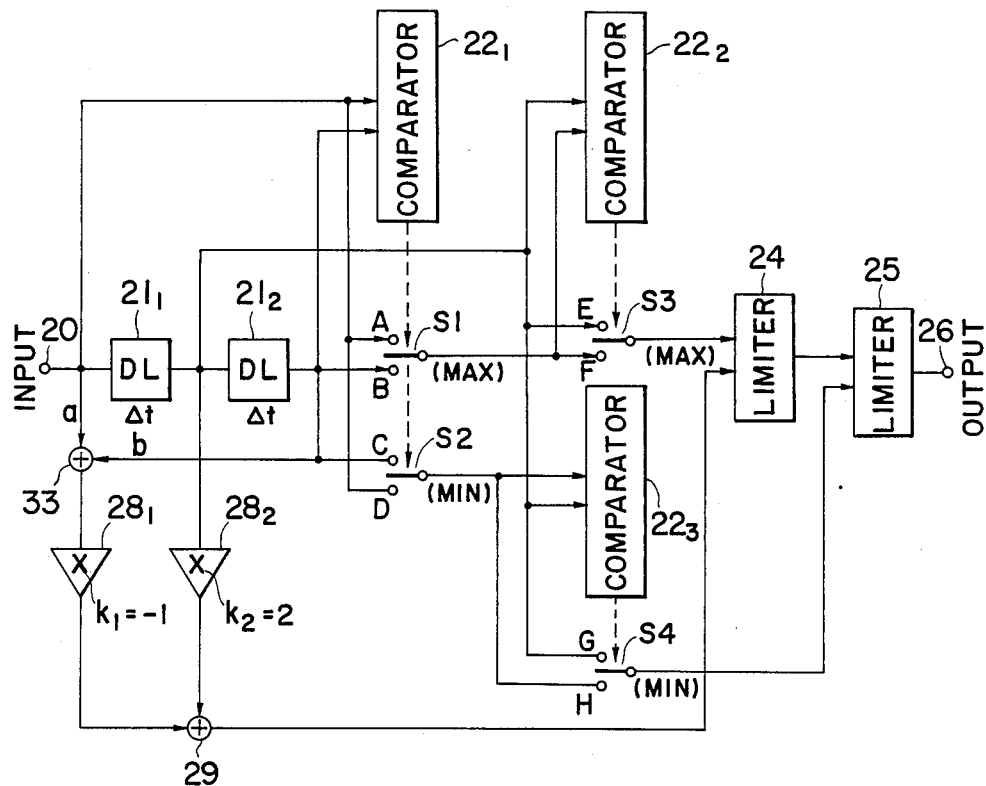
F I G. 24

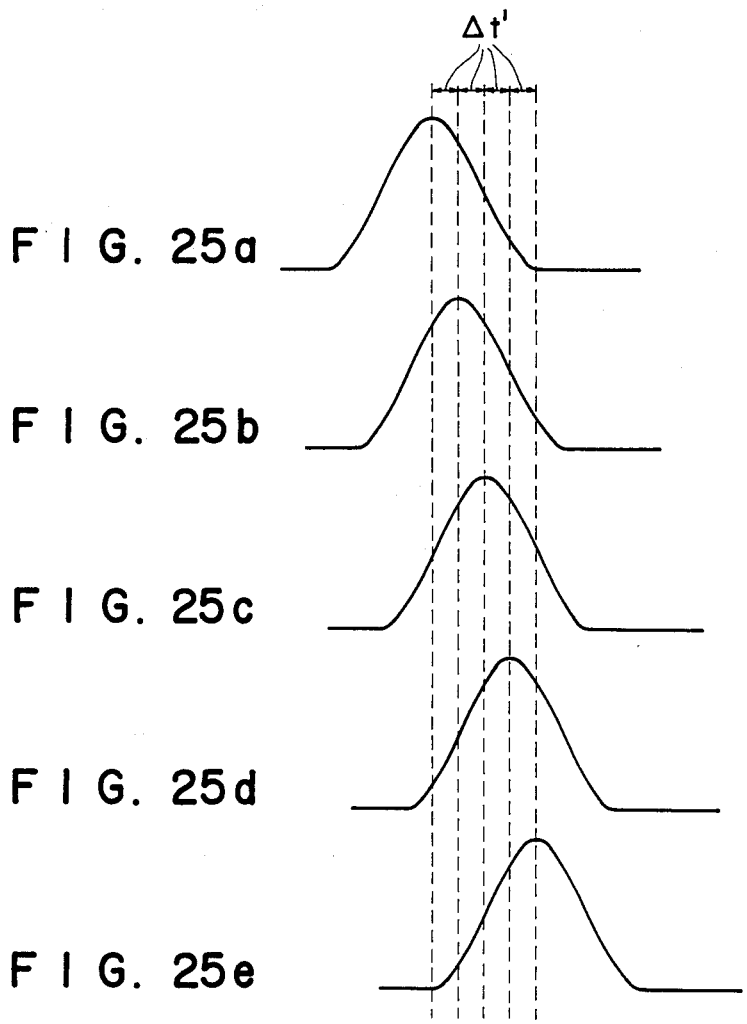

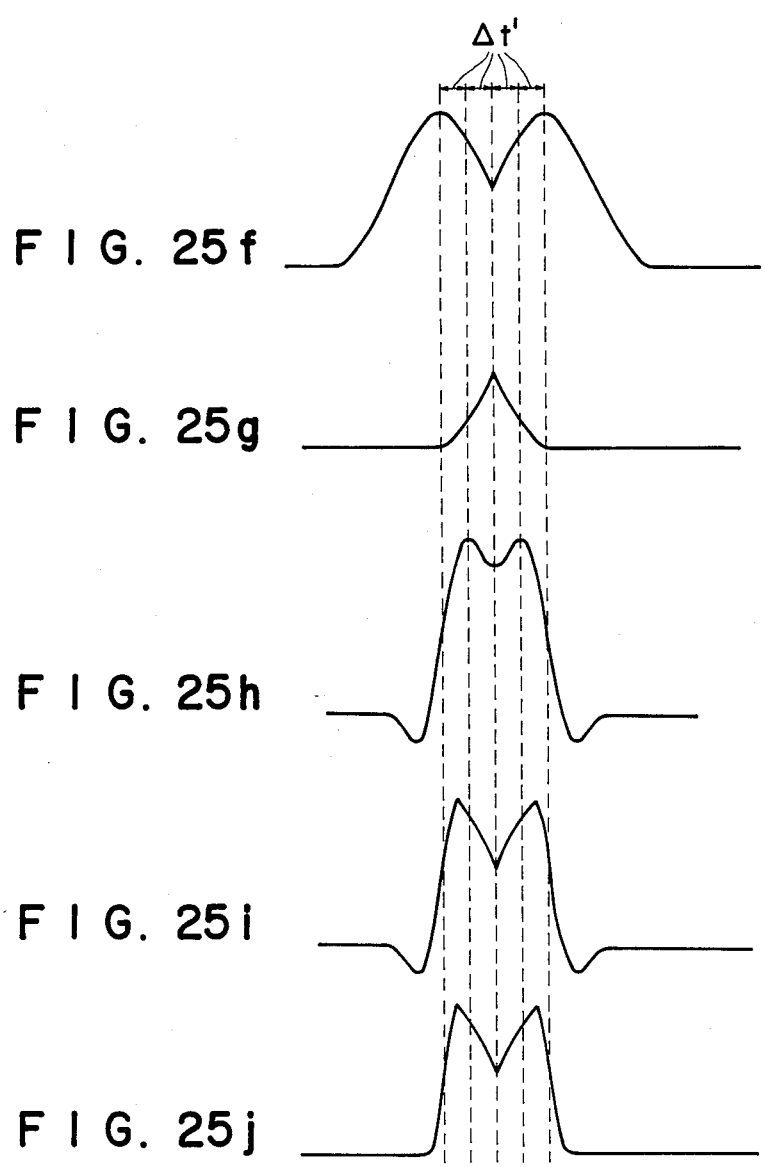

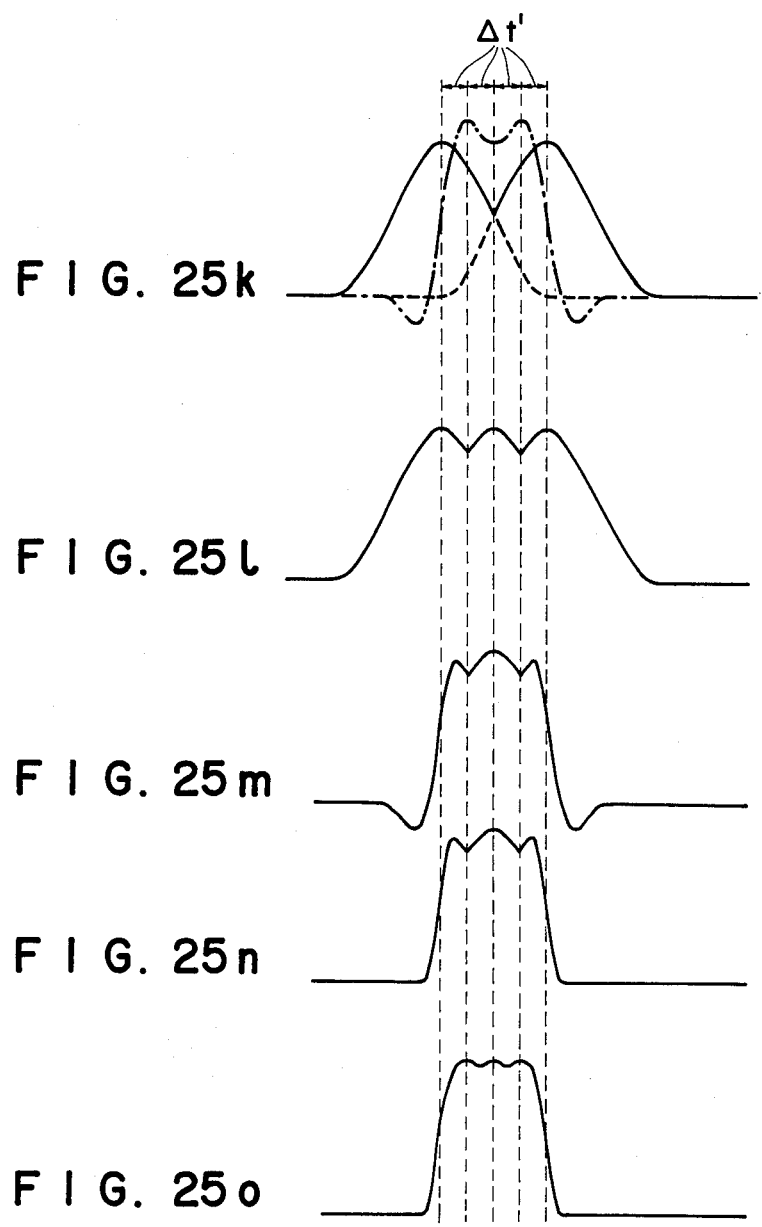

VIDEO SIGNAL PROCESSING CIRCUIT

BACKGROUND OF THE INVENTION

The present invention relates to a video signal processing circuit, and more particularly to a processing circuit to make an aperture correction or a picture quality restoration of a digitalized video signal in a video tape recorder (VTR) etc.

Television cameras pick up pictures and cathode ray tubes produce pictures by scanning electron beam. Since the section of such an electron beam is definite in size sudden changes of brightness or highly contrastd edges of pictorial images result in so-called "blurring" in the images. To correct such a blurring, aperture correction to compensate for degradation of higher frequency band components has been conventionally made.

Since the luminance signal band in home VTRs etc. is narrower than the corresponding broadcasted signal band, the image enhancement is conducted for the purpose of increasing the sharpness of the pictorial images.

A conventional aperture correction circuit is of the type using a single or two delay lines. The problem with such an aperture correction circuit is as follows. First, ringing or smear is likely to occur. Particularly, when correction is implemented to a color difference signal or a component signal, color ringing occurs. Especially in case where a noise is superimposed on an input signal, degradation of S/N ratio of the signal is inevitable.

In addition, the high frequency range of the frequency characteristic is solely emphasized in the above-mentioned respective conventional circuits, resulting in the problem that the noise components of the high frequency range are increased. To eliminate this problem, a circuit has been proposed in which a noise suppression circuit to suppress noise components is provided in such circuits.

However, the problem inherent to the last-mentioned circuit is that it is difficult to set the noise suppression level in the noise suppression circuit.

SUMMARY OF THE INVENTION

An object of the present invention is to provide a video signal processing circuit capable of producing an aperture correction signal or a picture quality correction signal free from ringing or smear.

Another object of the present invention if to provide a video signal processing circuit which can set the noise suppression level of the noise suppression circuit to a sufficiently large value, and which can produce an aperture correction signal or a picture quality correction signal in which the amplitude of the noise hardly becomes large.

According to the present invention, there is provided a video processing circuit comprising: high frequency range emphasis means for producing a high frequency range emphasized signal obtained by delaying an input video signal by a predetermined delay time and by emphasizing a high frequency range of said input video signal; a plurality of delay means connected serially for producing a plurality of signals having different delay times; selector means for effecting a level comparison among said input video signal and said signals with delays to separately take out signal data of a maximum level and that of a minimum level; a first limiter for limiting said high frequency range emphasized signal by comparing it with the signal of maximum or minimum level selected by said selector using said maximum or minimum level as a first threshold level; and a second limiter for limiting an output signal of said first limiter by comparing it with the signal of minimum or maximum level selected by said selector using said minimum or maximum level as a second threshold level.

According to a modification of the present invention, there is provided a video signal processing circuit comprising: high frequency range emphasis means for producing a high frequency range emphasized signal obtained by delaying an input video signal by a predetermined delay time and emphasizing a high frequency range of said input video signal; high frequency component extraction means for producing a high frequency component extracted signal obtained by delaying said input video signal by said predetermined delay time and taking out the high frequency component of said input video signal; a plurality of delay means connected serially for producing a plurality of signals having different delay times; selector means for effecting a level comparison among said input video signal and said signals with delays to separately take out a signal of a maximum level and that of a minimum level; a first limiter for limiting said high frequency range emphasized signal by comparing it with the signal of maximum or minimum level selected by said selector means using said maximum or minimum level as a limit level; a second limiter for limiting an output signal of said first limiter by comparing it with the signal of minimum or maximum level selected by said selector means using said minimum or maximum level as a limit level; noise suppression means for effecting the noise suppression of said high frequency component extracted signal; and adder means for making addition of an output of said noise suppression means and an output of said second limiter.

The advantages with the circuit according to the present invention are as follows. There is lessened possibility that ringing or smear occurs. Even when a correction is implemented to a color difference signal or a component signal, color ringing hardly occurs. This circuit makes the S/N ratio to be higher than the conventional circuit. Since the S/N ratio is not degraded, this circuit further can set an emphasis quantity of the high frequency range to a value higher than the conventional circuit. Furthermore, its circuit construction is simple and the integration as an IC is easy. In addition, this circuit allows the noise suppression level of the noise suppression circuit to be equal to a sufficiently large value. This circuit also makes it possible to emphasize both the waveform edge of small amplitude and the edge of large amplitude and to produce a correction signal in which the amplitude of noise hardly becomes large.

BRIEF DESCRIPTION OF THE DRAWINGS

In the accompanying drawings;

FIG. 1 is a block diagram illustrating one example of a conventional circuit;

FIGS. 2a through 2e show signal waveforms of the circuit shown in FIG. 1;

FIG. 3 is a block diagram illustrating another example of a conventional circuit;

FIGS. 4a through 4f show signal waveforms of the circuit shown if FIG. 3;

FIG. 8 is a block diagram illustrating a first embodiment of a video signal processing circuit according to the present invention.

FIG. 10 shows a frequency characteristic curve of a high frequency range emphasis filter used in the circuit of FIG. 8;

FIG. 11 is a block diagram illustrating the circuit construction of the high frequency range emphasis filter used in the circuit of FIG. 8;

FIGS 12 and 13a through 13c are diagrammatical views showing the comparison between signal waveforms in the circuit according to the present invention and those in the conventional circuit;

FIG. 14 is a block diagram illustrating a second embodiment of a video signal processing circuit according to the present invention;

FIG. 15 is a block diagram showing the circuit construction of the high frequency range emphasis filter used in the circuit of FIG. 14;

FIG. 17 is a block diagram illustrating a third embodiment of a video signal processing circuit according to the present invention;

FIGS. 18a through 18j show signal waveforms of the circuit illustrated in FIG. 17;

FIG. 24 is a block diagram illustrating a fifth embodiment of a video signal processing circuit according to the present invention; and FIGS. 25a through 25o show waveforms of the circuit according to the present invention.

DETAILED DESCRIPTION OF THE INVENTION

Figure 5:
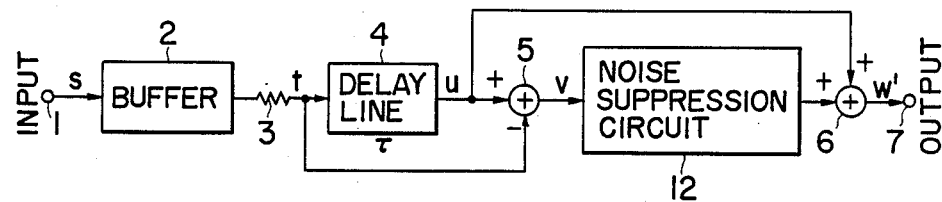
FIG. 5 is a block diagram illustrating a further example of a conventional circuit.
Figure 6:
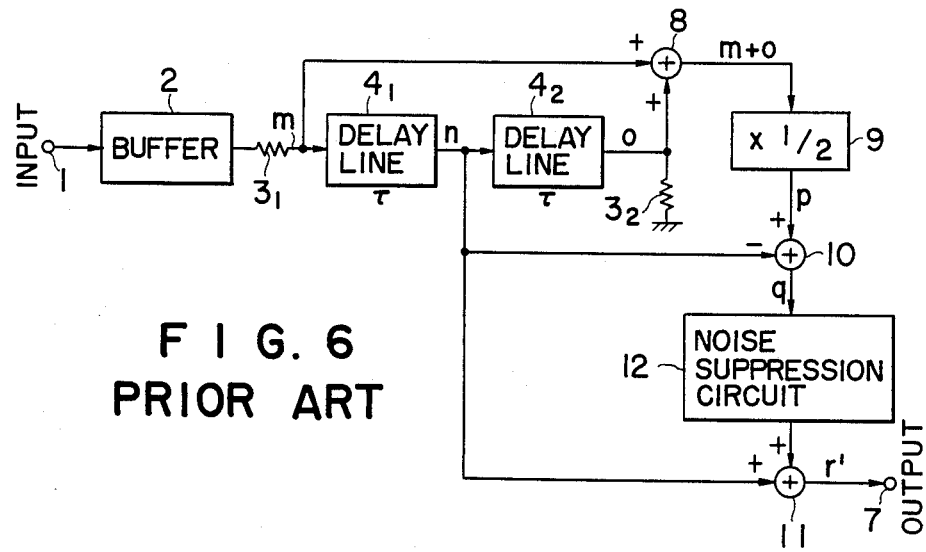
FIG. 6 is a block diagram illustrating a still further example of a conventional circuit.

Prior to the description of the present invention, previously proposed circuits will be explained together with their defects of problems.

FIG. 1 is a block diagram illustrating one example (one delay line is used) of the conventional aperture correction circuits. In the circuit shown in this figure, a video signal h (FIG. 2a) incoming to the terminal 1 is delivered to a delay line 4 via a buffer 2 and a matching resistor 3. Thus, a signal j delayed by an interval (delay time) $\tau$ (FIG. 2c) is obtained. In this case, if no matching resistor exists on the output side of the delay line 4, the signal would reflect on the output side, so that the signal is fed back to the input side and is combined with a signal on the input side. resulting in a signal i (FIG. 2b). The signal i has a waveform obtained by the sum of the signal h and a signal delayed by an interval 2$\tau$. The signal h is delivered to a subtracter 5, at which the signal i is subtracted therefrom, resulting in a signal k (FIG. 2d). The signals j and k are added together at an adder 6, resulting in an aperture correction signal l (FIG. 2e). The signal l thus obtained is taken out from the terminal 7.

FIG. 3 is a block diagram illustrating another example (two delay lines are used) of the conventional circuits, which can also be applicable to the digital video signal. In the circuit shown in this figure, a video signal incoming to the terminal 1 is changed to a signal m (FIG. 4a) by causing it to pass through a buffer 2 and a matching resistor $3_1$. The signal m thus obtained is changed to a signal n (FIG. 4b) by causing it to pass through a delay line $4_1$ having a delay time $\tau$. Further, the signal n thus obtained is changed to a signal o (FIG. 4c) by causing it to pass through a delay line $4_2$ having the same delay time $\tau$ as that of the delay line $4_1$. The signals o and m are added together at an adder 8. Then, the level of the resultant signal obtained as an output of the adder 8 is caused to be reduced to one-half at a level halving circuit 9, resulting in a signal p. The signal p thus obtained is delivered to a subtracter 10, at which the signal n is subtracted therefrom, resulting in a signal g (FIG. 4e). The signals g and n are added together at an adder 11, resulting in an aperture correction signal r (FIG. 4f). The signal r thus obtained is taken out from the terminal 7.

With such circuits, as seen from FIGS. 2e and 4f, there occurs ringing so that oscillation occurs at the rise portion of the waveform due to transient phenomena. As a result, oscillatory fringes of white and black are produced at portions where black levels of the picture signal shifts to white levels thereof and vice versa. If the length of the ringing portion is large, there occurs, as previously mentioned, a smear by which the contour of the pictorial image becomes indistinct.

Examples of circuits for eliminating noise superimposed on an input signal so as to prevent degradation of S/N ratio are as follows.

FIG. 5 shows a conventional circuit corresponding to the circuit shown in FIG. 1. Between the subtracter 5 and the adder 6, is provided a noise suppression circuit 12, producing a signal w' from which a noise component is suppressed. On the other hand, FIG. 7 is a conventional circuit corresponding to the circuit shown in FIG. 3. Between the subtracter 10 and the adder 11, is provided a noise suppression circuit 12, for producing a signal r' from which a noise component is suppressed.

Figure 7A:
FIGS 7a and 7b show signal waveforms showing the relationship between the noise suppression level and the signal emphasis.
Figure 7B:
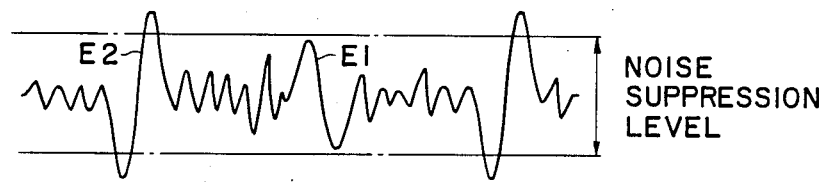

The problem of the noise suppression with such circuits will be described with reference to FIGS. 7a and 7b. More particularly, with these conventional circuits, there occurs a phenomenon such that when the noise suppression level is set too low noise components increase as shown in FIG. 7a, while when the noise suppression level is set too high, the edge $E_1$ having a small amplitude is not emphasized, but only the edge $E_2$ having a large amplitude is emphasized, with the result that it is difficult to set an optimum noise suppression level.

The present invention is intended to solve the above-mentioned problems.

Figures 9A, 9B, 9C, 9D, 9E, 9F, 9G:
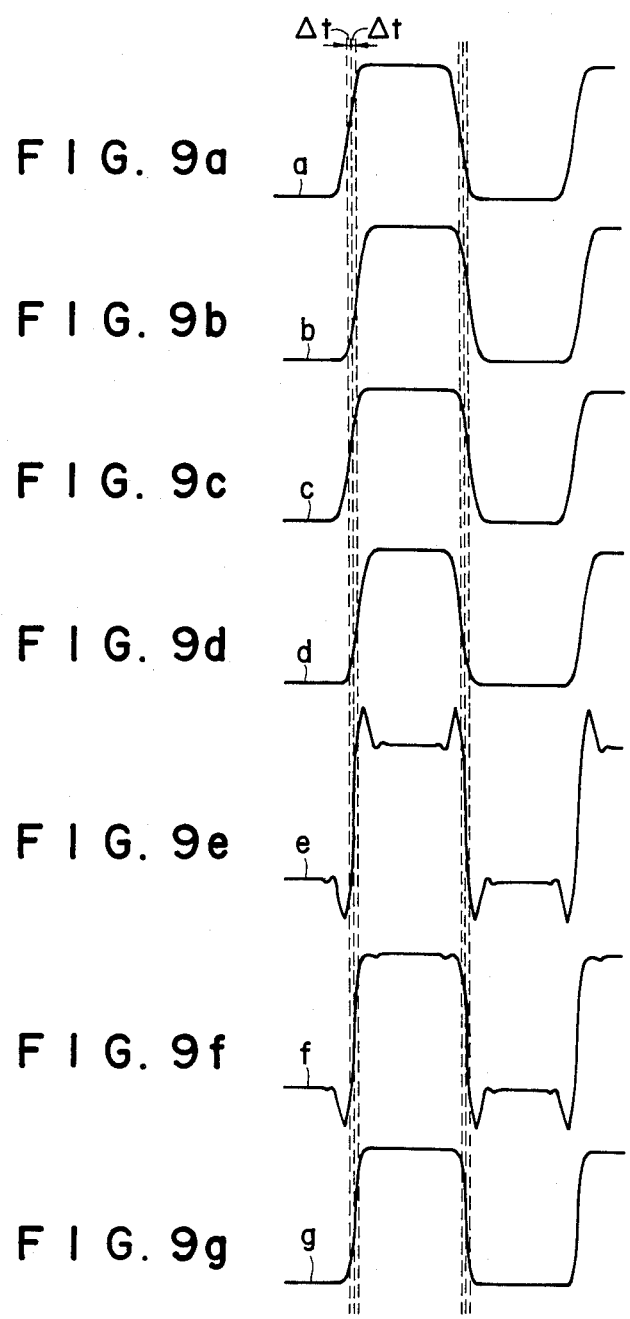
FIGS. 9a through 9g shows signal waveforms useful to explain the operation of the circuit shown in FIG. 8.

FIG. 8 is a block diagram illustrating a first embodiment of circuit according to the present invention. While a video signal which is processed as will be described hereinafter is usually a digital video signal, since it is impossible to observe the waveform in the case of the digital video signal, the description of the digital video signals will be represented by using the waveforms of analog video signals corresponding thereto for the sake of easy understanding. A video signal a (FIG. 9a) incoming to the terminal 20 is delayed by a time $2\Delta t$ in a delay circuit 21 having a delay time $2\Delta t$, resulting in a signal b (FIG. 9b). The signal b thus obtained is delivered to a comparator 22 and the signal a is also delivered to the comparator 22 as it is. The comparator 22 effects a level comparison between the data of the signal a and that of the signal b to effect switching of the terminals A and B of the switch S1 so as to select a signal data of a higher level of the signals a and b, and to effect switching of the terminals C and D of the switch S2 so as to select a signal data of a lower level of the signals a and b. Thus, data of a signal c (FIG. 9c) is taken out from the switch S1 and data of a signal d (FIG. 9d) is taken out from the switch S2.

On the other hand, the video signal a is delayed by a time $\Delta t$ at a high frequency range emphasis filter 23 having a frequency characteristic shown in FIG. 10 and undergoes high frequency range emphasis thereat, thus forming a signal e (FIG. 9e). The high frequency range emphasis filter 23 is comprised of a transversal filter shown in FIG. 11. In this case, the phase characteristic of the filter is preferred to be linear for better picture quality. In FIG. 11, DLs denote delay lines and ko to kn denote coefficient multiplier circuits.

The signals c and e are delivered to a limiter 24, at which the level data of the signal e is limited by comparing it with the level data of the signal c being used as a threshold level, resulting in a signal f (FIG. 9f) particularly the upper side ringing of which has been eliminated. In addition, the level data of the signals f and d are delivered to a limiter 25, at which the level data of the signal f is limited with the level data of the signal d, the level of the latter acting as a threshold level, thereby producing a signal g (FIG. 9g) in which it is particularly to be noted that the lower side ringing of which has been eliminated. The signal g thus obtained is taken out from the terminal 26 as an aperture correction signal.

The signal g is steep at its rise and fall portions and the upper and lower side ringings have been eliminated at its edge portions. Namely, the signal g is equivalent to a signal obtained by allowing the signal a to be steepened at its rise and fall portions.

FIG. 12 shows output signal waveforms of the conventional circuit and the circuit according to the present invention. In this figure, the solid line represents an output signal g obtained with the circuit according to the present invention and broken lines represent an output signal obtained with the conventional circuit, which is substantially equivalent to the signal e obtained with the circuit according to the present invention. It is seen from this figure that the output signal g obtained with the circuit according to the present invention does not cause ringing or smear while having the same inclination or gradient as that of the signal obtained with the conventional circuit.

In case where an input signal a' (FIG. 13a) on which noise is superimposed is incoming, an output signal e' (which is substantially the same as the output signal obtained with the conventional circuit) of the high frequency range emphasis filter 23 suffers in a manner that noise is greately emphasized (FIG. 13c), but an output signal g' of the limiter 25 results in a signal whose noise components and upper and lower side ringings have been eliminated as shown in FIG. 13b. In this instance, since the S/N ratio of the signal used for each threshold level of the limiters 24 and 25 is the same as the S/N ratio of the input signal, there is no possibility that the S/N ratio in the flat portion is degraded even if a noise is superimposed on the input signal.

FIG. 14 is a block diagram illustrating a second embodiment of a circuit according to the present invention. In this figure, components identical to those in FIG. 8 are represented with the same reference numerals, respectively, and their description will be omitted. The high frequency range emphasis filter 27 comprises a transversal filter shown in FIG. 15 and produces a signal taken out via respective delay lines DLs as a delay output b and an output signal of an adder ADD as a high frequency range emphasized output e.

It is to be noted that when the multiplying coefficient circuits ko to kn in the high frequency band emphasis filters 23 and 27 are constructed so that they are externally controlled to be variable, it is possible to arbitrarily set a degree of high frequency range emphasis.

Figure 16:
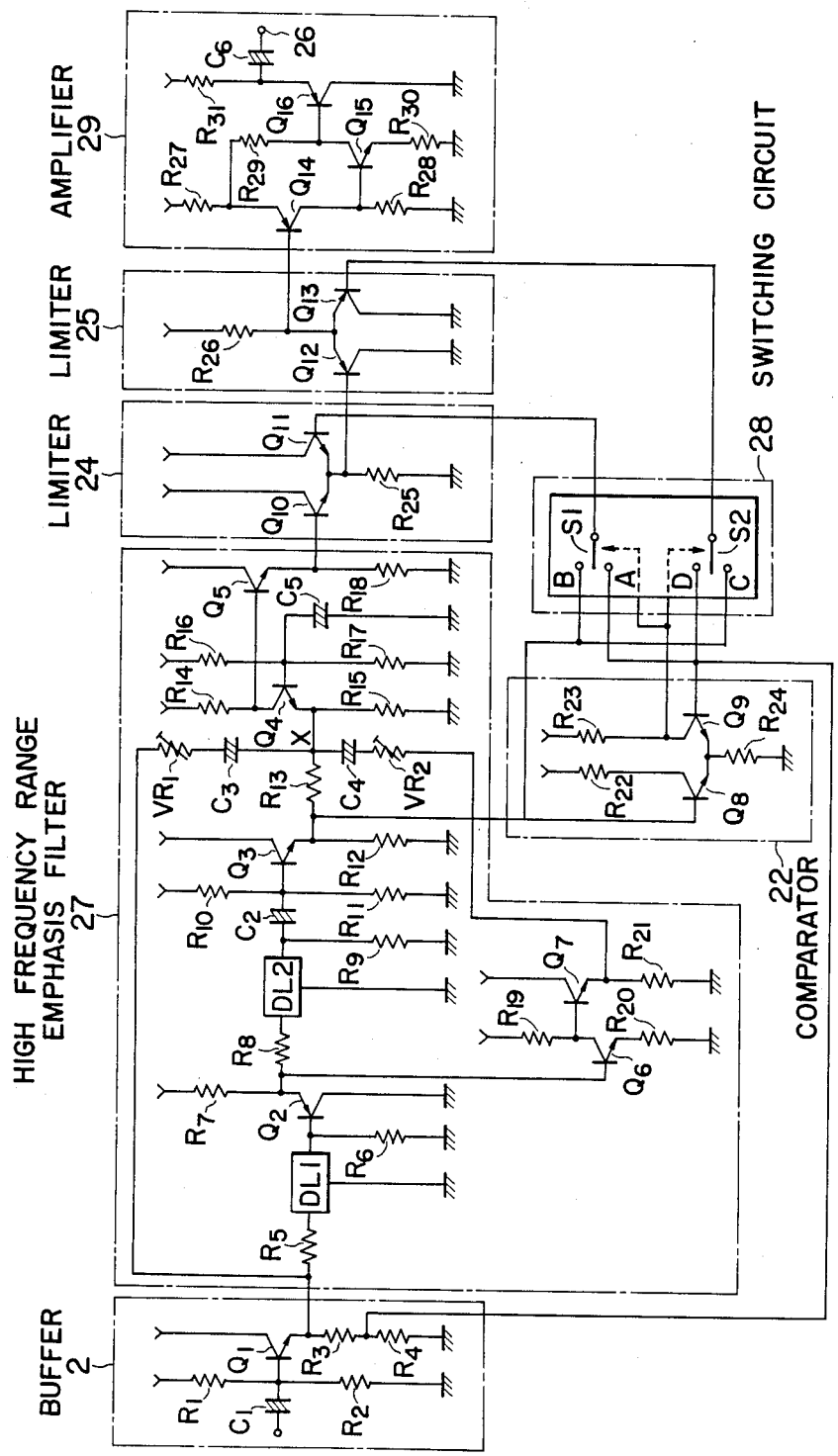
FIG 16 is a circuit diagram in which the circuit shown in FIG 14 is constructed with an analog circuit.

FIG. 16 is a detailed circuit diagram in which the circuit construction shown in FIG. 14 is realized with an analog circuit.

In this embodiment, the inputted signal is buffered by a buffer circuit 2 which comprises a common-collector npn transistor Q1. The base voltage of the transistor Q1 is determined by the ration of resistance of voltage divider resistors R1 and R2. The output of buffer 2 is supplied to the high frequency range emphasis filter 27 and to one of the inputs of comparator 22 and to terminals A and D of the switching circuit 27. The level of the signal supplied to the comparator 22 is determined by the voltage divider R3 and R4.

The high frequency range emphasis filter 27 is composed of a first delay circuit having a delay time $\Delta t$, a second delay circuit having a delay time $\Delta t$, a first multiplying coefficient circuit which multiplies the input signal by a first coefficient, a second multiplying coefficient circuit which multiplies the output of the first delay circuit by a second coefficient, and an adder circuit.

The first delay circuit comprises an input resistor R5, a delay line DL1 and a common-collector amplifier (emitter follower) using a pnp transistor Q2, a terminating resistor R6 for the delay line DL1 and a biasing resistor R7. The second delay circuit comprises an input resistor R8, a delay line DL2, a common-emitter amplifier using an npn transistor Q3, a terminating resistor R9 for the delay line DL2 and biasing resistors R10–R12. The emitter terminal of the transistor Q3 is connected to the other input terminal of the comparator 22 (base terminal of transistor Q8), to the terminals B and C of the switch S1 and to the input point of the adder circuit (point x) which is the emitter terminal of an npn transistor Q4 of the adder circuit through a resistor R13. The first multiplying coefficient circuit comprises a serially connected adjustable resistor VR1 and a capacitor C3 and connects the input point of the first delay circuit to point X. The second multiplying coefficient circuit comprises a two-stage amplifier using two npn transistors Q6, Q7 and resistors R19–21, and a serially connected adjustable resistor VR2 and a capacitor C4. This circuit connects the output point of the first delay circuit to point X. The adder circuit comprises a common-base npn transistor Q4, a common-emitter npn transistor Q5 and biasing resistors R14–R18 and capacitor C5.

This circuit adds the three input signals at point X and amplifies sum signal to the appropriate level.

The comparator 22 is a differential amplifier and is composed of a pair of similar transistors Q8 and Q9 each having load resistors R22, R23, coupled together through a common-emitter resistor R24. The output of this comparator 22 is used to control the switches S1 and S2 of the switching circuit 27.

The limiter 24 is composed of a pair of similar npn transistors Q10 and Q11 coupled together through a common-emitter resistor R25. Similarly, the limiter 25 is composed of a pair of similar pnp transistors Q12 and Q13 coupled together through a common emitter resistor R26. The common emitter point is connected to the amplifier 29.

The amplifier 29 is a three-stage amplifier comprising transistors Q14–Q16 and biasing resistors R27–31. The output signal is obtained from the output terminal 26.

FIG. 17 is a circuit diagram illustrating a third embodiment of a circuit according to the present invention. A video signal a (FIG. 18a) incoming to the terminal 20 is delayed by a time $2\Delta t$ at delay circuits $21_1$ and $21_2$, resulting in a signal b (FIG. 18b). The signal b thus obtained is delivered to a comparator 22 and the video signal a is also delivered to the comparator 22 as it is. The comparator 22 makes a level comparison between the data of the signal a and that of the signal b to effect switching of the terminals A and B of a switch S1 so as to select a signal data of higher level of the signals a and b, and to effect switching of the terminals C and D of a switch S2 so as to select a signal data of lower level of the signals a and b. Thus, data of a signal c (FIG. 18c) is taken out from the switch S1 and data of a signal d (FIG. 18d) is taken out from the switch S2.

On the other hand, the input signal a and the output signal b of the delay circuit $21_2$ are added at an adder 33. The resultant signal obtained as an output of the adder 33 is multiplied by the coefficient k1 at a multiplier $28_1$ for multiplication of by the coefficient k1=−0.5. The output of the delay circuit $21_1$ is multiplied by the coefficient k2 at a multiplier $28_2$ for multiplication of the coefficient k2=2. The multiplied result of the multiplier $28_2$ and the output of the multiplier $28_1$ are added at an adder 29, resulting in a signal e (FIG. 18e). Further, the output of the delay circuit $21_1$ and the output of the multiplier $28_1$ are added at an adder 30, resulting in a signal h (FIG. 18h).

In this embodiment, the high-pass filter is constituted with the delay circuits $21_1$ and $21_2$, the adders 33 and 30, and the multiplier $28_1$. The high frequency range emphasis filter is constituted with the delay circuits $21_1$ and $21_2$, the adders 35 and 29, and the multipliers 28 and $28_2$. The delay circuits $21_1$ and $21_2$ are commonly used in the high-pass filter and the high frequency range emphasis filter.

The signals c and e are delivered to the limiter 24, at which data of the signal e is limited by comparing it with data of the signal c, the level of the latter acting as a threshold level, resulting in a signal f (FIG. 18f) particularly the upper side waveform ringing of which has been eliminated. Data of the signals f and d are delivered to the limiter 25, at which data of the signal f is limited by comparing it with data of the signal level of the latter acting as a threshold level, resulting in a signal g (FIG. 18g) particularly the lower side ringing of which has been eliminated.

The signal g is steep at its rise and fall portions and the upper and lower side waveform ringings have been eliminated at its edge portions. Namely, the signal g is equivalent to a signal obtained by allowing the signal a to be steepened at its rise and fall portions.

Figure 19:
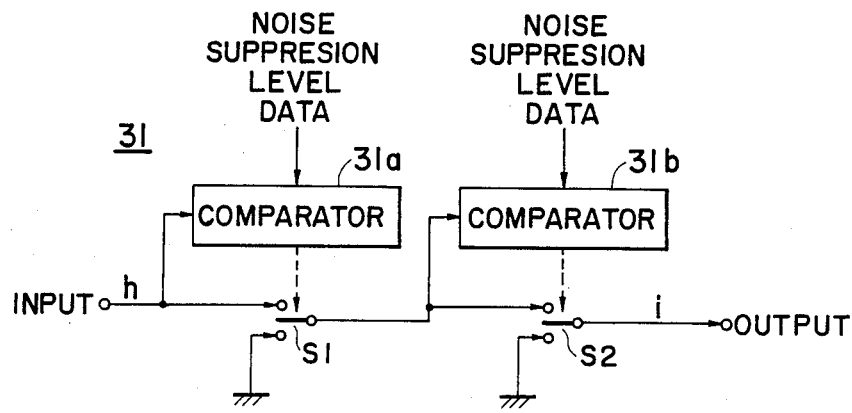
FIG. 19 is a block diagram illustrating an actual example of the noise suppression circuit.

The signal h (FIG. 18h) is delivered to a noise suppression circuit 31 constituted as shown in FIG. 19, resulting in a signal i (FIG. 18i) from the large amplitude edge component of the signal h. As seen from FIG. 19, the noise suppression circuit 31 comprises a comparator 31a and a comparator 31b. The comparator 31a operates to make a comparison between the input signal h and the noise suppression level data to connect the switch SW1 to the lower (upper) side when the signal h is larger (smaller) than the other. Similarly, the comparator 31b operates to make a comparison between an output signal of the switch SW1 and the noise suppression level data to connect the switch SW2 to the lower (upper) side when the output signal of the switch SW1 is smaller (larger) than the other. Thus, the signal h undergoes a change such that only the large amplitude edge component has been taken out, resulting in a signal i.

The signal g (FIG. 18g) and the signal i (FIG. 18i) are added at an adder 32, resulting in a signal j in which the rise and fall edges are emphasized. In this case, since the signal g (FIG. 18g) has a waveform such that the gradient is steep and the emphasis of the small amplitude edge has been completed, even when the noise suppression level of the noise suppression circuit 31 is caused to be larger than that of the conventional circuit, there is no possibility that an adverse effect as in the conventional circuit will occur, with the result that the noise suppression level is caused to be sufficiently large, thus permitting both the small amplitude level and the large amplitude level of the waveform to be emphasized.

Figure 20A:
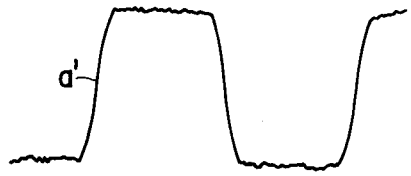
FIGS. 20a through 20c are diagrammatical views showing the comparison between signal waveforms in the circuit according to the present invention and those in the conventional circuit.
Figure 20B:
Figure 20C:

In case where an input signal a' (FIG. 20a) on which noise is superimposed is incoming, the output signal obtained with the conventional circuit suffers so that noise is greatly emphasized as shown in FIG. 20b. On the contrary, the output signal g' of the limiter 25 only undergoes an effect such that the amplitude of the noise component hardly becomes large as shown in FIG. 20c, resulting in a signal in which the rise and fall edges have been emphasized. In this case, since the S/N ratio of the signal used for each threshold level of the limiters 24 and 25 is the same as the S/N ratio of the input signal, there is no possibility that the S/N ratio at the flat portion of the waveform is degraded even when noise is superimposed on the input signal.

Thus, since the noise amplitude hardly becomes large in the output signal of the limiter 25 and it is possible to allow the noise suppression level of the noise suppression circuit 31 to be larger than that of the conventional circuit, noise is hardly included in the output signal i, but only the large amplitude edge component is included therein. Accordingly, the output signal j in which the noise amplitude hardly becomes large is obtained.

Figure 21:
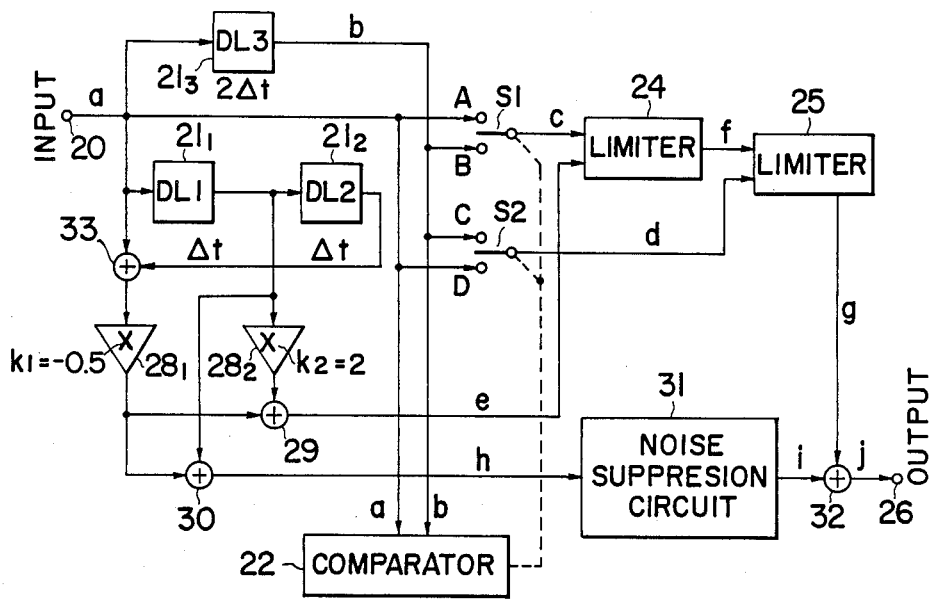
FIG. 21 is a block diagram illustrating a fourth embodiment of a video signal processing circuit according to the present invention.

FIG. 21 is a block diagram illustrating a fourth embodiment of a circuit according to the present invention. In this figure, components identical to those in FIG. 17 are represented with the same reference numerals, respectively, and their explanation will be omitted.

In the circuit shown in this figure, a delay circuit $21_3$ has a delay time of $2\Delta t$. By delaying an input signal by the time $2\Delta t$, this circuit 21 produces a signal b to deliver it to a comparator 22 and switches S1 and S2. Such a circuit configuration is used in the case where it is not desirable in view of the problem of fan out that the high frequency range emphasis filter or the high-pass filter and the delay circuit for obtaining the signal b are commonly used. Since the operation and the advantage of this circuit are the same as those in the third embodiment, its explanation will be omitted.

Figure 22:
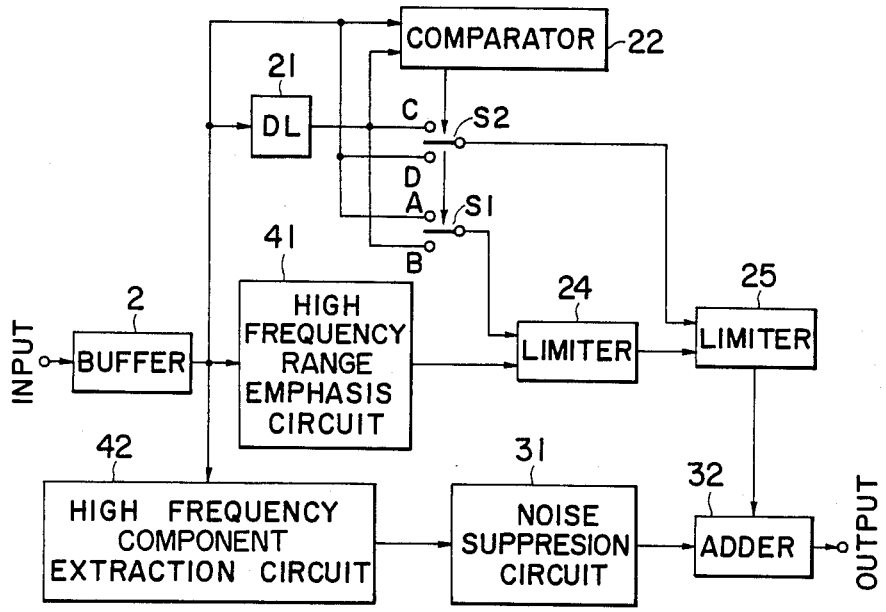
FIG. 22 is a block diagram illustrating a circuit in which the circuit in the third embodiment of the present invention and that in the fourth embodiment are combined with each other.

FIG. 22 is a common block diagram for the third and fourth embodiments.

In this embodiment, the inputted signal is buffered by the buffer 2, then it is applied to one of the input terminals of the comparator 2, the delay circuit 21, the high frequency range emphasis circuit 41 and the high frequency component extraction circuit 42. The output terminal of the delay circuit 21 is connected to the other input terminal of the comparator 22, terminal C of the switch S2 and terminal A of the switch S1. The signal derived from the switch S1 is delivered to the limiter 24 together with the output signal of the high frequency range emphasis circuit 41. The signal derived from the switch S2 is delivered to the limiter 25 together with the output of the limiter 24.

The output of the high frequency component extraction circuit 42 is inputted to the noise suppression circuit 31 and the output of the noise suppression circuit 31 is inputted to the adder circuit 32 together with the output of the limiter 25. The output of this video signal processing circuit is taken out from the output terminal of the adder circuit 32.

Figure 23:
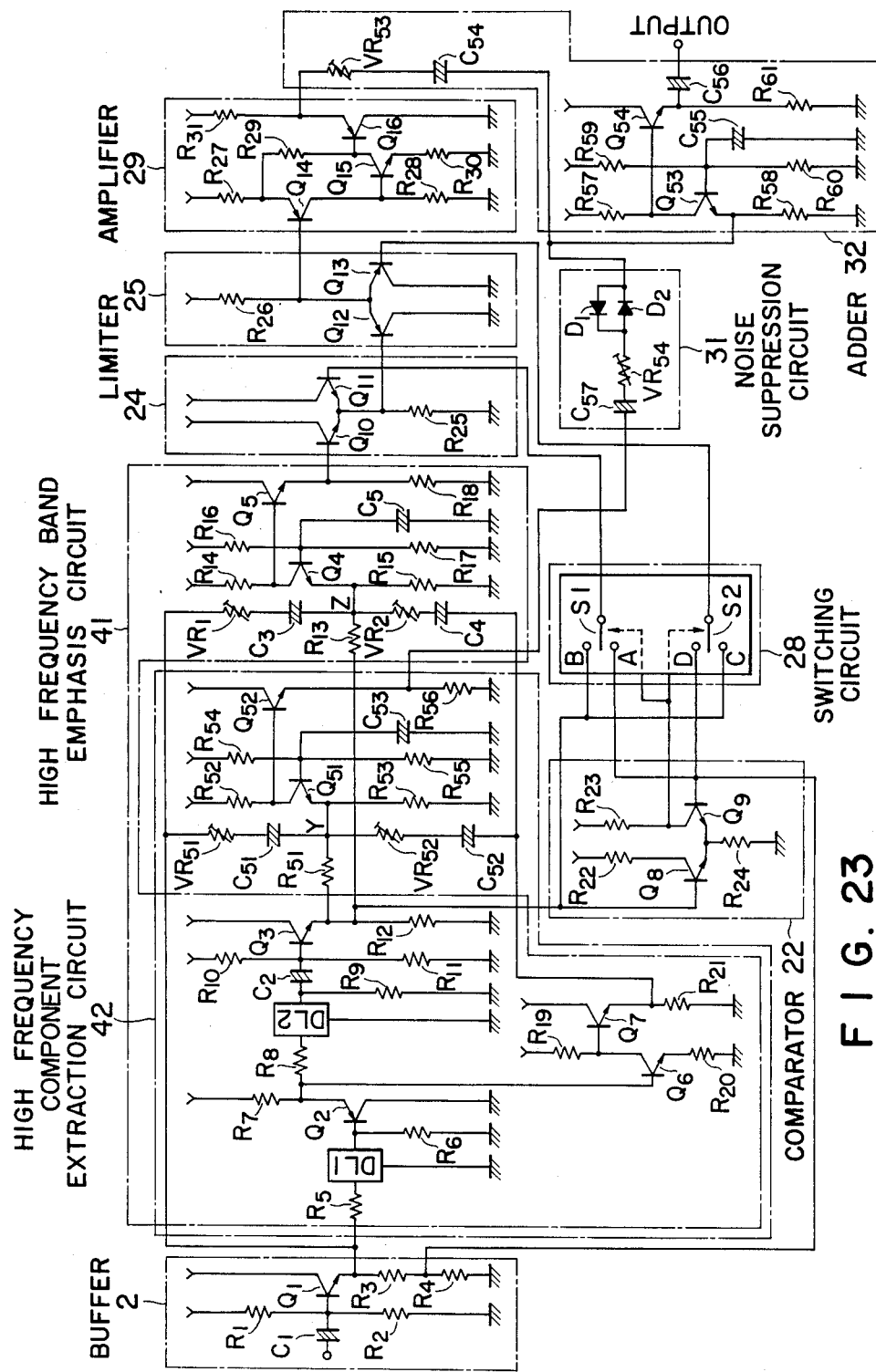
FIG. 23 is a circuit diagram in which the circuit shown in FIG. 22 is realized with an analog circuit.

FIG. 23 is a detailed circuit diagram in which the circuit configuration shown in FIG. 22 is realized with an analogue circuit.

In this embodiment the buffer 2, the comparator 22, the limiters 24 and 25, the amplifier 28 and the switching circuit 27 have an identical arrangement to those explained in FIG. 16, therefore the same reference numerals are given to them and the detailed descriptions will be omitted The high frequency range emphasis circuit 41 has an identical arrangement to the high frequency range emphasis filter 27 shown in FIG. 16. And the high frequency range component extraction circuit 42 has an arrangement in which are provided transistors Q51 and Q52, capacitors C51–C53, resistors R51–R56 and adjustable resistors VR51 and VR52, which form an adder circuit, and these correspond to transistors Q4 and Q5, capacitors C3–C5, resistors R13–R18 and adjustable resistors VR1 and VR2 of the high frequency band emphasis circuit 41. The emitter terminal of the transistor Q52 is connected to the noise suppression circuit 31, which feeds an adder of the same arrangement as mentioned above.

The noise suppression circuit is composed of serially-connected a capacitor C57, adjustable resistor VR54 and a pair of diodes D1, D2 connected in parallel with their respective polarities reversed. The output terminal of the noise suppression circuit is connected to the emitter terminal of the transistor Q53 in the adder 32. The output of the amplifier 28 is also inputted to the adder 32 through a variable resistor 53 and a capacitor C54.

The adder 32 is composed of transistors Q53 and Q54, capacitor C55, and resistors R57–R61, which are the same as in the above-mentioned adder in the high frequency range emphasis circuit 41.

It is to be noted that signals selected by the switches S1 and S2 in the circuit shown in FIG. 17 or 21 may be opposite to those in the above-mentioned embodiments, thus to eliminate the lower and upper side waveform ringings at the limiters 24 and 25, respectively.

The coefficients k1 and k2 of the respective multipliers $28_1$ and $28_2$ are not limited to those in the above-mentioned embodiment.

In addition, the number of stages of the high frequency range emphasis filter is not limited to two.

FIG. 24 shows the fifth embodiment of the present invention, which relates to a more universal case.

In the circuit shown in this figure, since two delay circuits $21_1$ and $21_2$, two multipliers $28_1$ and $28_2$, adders 29 and 33 two switches S1 and S2 and limiters 24 and 25 are identical to those in FIG. 17, and a comparator $22_1$ corresponds to the comparator 22 in FIG. 17, their detailed descriptions will be omitted.

Two comparators $22_2$ and $22_3$ and two switches S3 and S4 are newly provided. The comparator $22_1$ makes a level comparison between the data of input signal a and that of the signal b which is the output signal of DL $21_2$ with a delay of $2\Delta t$ to effect switching of the terminals A and B of the switch S1 so as to select a signal data of higher level of the signals a and b, and to effect switching of the terminals C and D of the switch S2 so as to select a signal data of lower level of the signals a and b. The comparator $22_2$ makes a level comparison between the selected higher signal data and that of an output signal of DL $21_1$ with a delay of $\Delta t$ to effect switching of the terminals E and F of the switch S2 so as to select the signal data of highest level among the input signal, the signal with a delay of $1\Delta t$ and the signal with a delay of $2\Delta t$. Similarly, the comparator $22_3$ compares the level of the selected lower signal to the level of an output signal of DL $21_1$ with a delay of $\Delta t$ to effect switching of the terminals G and H of the switch S3 so as to select the signal data of lowest level among the input signal, the signal with a delay of $1\Delta t$ and the signal with a delay of $2\Delta t$. The selected highest (maximum) signal is inputted to the limiter 24 as its threshold level and the selected lowest (minimum) signal is inputted to the limiter 25 as its threshold level.

The necessity and the effect of the fifth embodiment is described in reference to FIG. 25.

Now, suppose that five input signals each of which have different delays 0 (FIG. 25a), $\Delta t$, (FIG. 25b), $2\Delta t'$ FIG. 25c), $3\Delta t'$ (FIG. 25d), $4\Delta t'$ (FIG. 25e) are processed by a video signal processing circuit. According to the embodiment shown in FIG. 17, the maximum signal obtained from signals in FIG. 25a and in FIG. 25e is described in FIG. 25f and the minimum signal obtained from signals in FIG. 25a and FIG. 25e is described in FIG. 25g.

FIG. 25h shows a waveform which is obtained by emphasizing a high frequency range of the signal shown in FIG. 25c, and FIG. 25i shows a waveform which is obtained by limiting the signal shown in FIG. 25h by applying the signal shown in FIG. 25f thereto as a higher threshold level. Similarly, FIG. 25i shows a waveform which is obtained by limiting the signal shown in FIG. 25i by applying the signal shown in FIG. 25g thereto as a lower threshold level.

FIG. 25k shows the three waveforms shown in 25f, 25g and 25h together.

As seen from these figures, there is a problem that in processing pulses with narrow width, a considerable dip will be formed in the midpoint of the output signal waveform. This embodiment solves this problem by obtaining the maximum and minimum levels from an input signal and outputs signals of every output points of serially connected delay circuits.

FIG. 25*l* shows the maximum signal obtained from signals shown in FIGS. 25*a*, 25*c* and 25*e*, and FIG. 25*m* shows a signal obtained when the signal shown in FIG. 25*h* is limited by using the signal shown in FIG. 25*l* as a highest threshold level. FIG. 25*n* shows a signal obtained when the signal shown in FIG. 25*m* is limited by using the signal shown in FIG. 25*g* as a lowest threshold level. As seen from in FIG. 25*n* the dip of level is decreased.

If four delay circuits are used and the maximum level and minimum level are determined from 5 signals, the dip is further decreased as shown in FIG. 25*o*.

Accordingly, if the limiting is performed using the maximum and minimum signals obtained from signals having different delays, the waveform of an output signal is improved.

What is claimed is:

1. A video signal processing circuit for aperture correction or picture quality restoration comprising:
   high frequency range emphasis means for producing a high frequency range emphasized signal obtained by delaying an input video signal by a predetermined delay time and by emphasizing a high frequency range of said input video signal;
   delay means for delaying the input video signal to produce a plurality of delayed signals having different delay times;
   selector means for selecting the maximum and the minimum level signals from among said input video signal and said plurality of delayed signals having different delay times; and
   limiter means for limiting in level said high frequency range emphasized signal by using said maximum and minimum level signals selected by said selector means as an upper limit and a lower limit, respectively.

2. A video signal processing circuit as set forth in claim 1, wherein said delay means is comprised of two delay circuits which produce two delayed signals obtained by delaying said input video signal by two delay times which are equal to said predetermined delay time and twice said predetermined delay time, respectively.

3. A video signal processing circuit as set forth in claim 1, wherein said high frequency range emphasis means is comprised of a high frequency range emphasis filter, and said delay means are comprised of delay circuits which have a circuit construction used in common with said high frequency range emphasis filter.

* * * * *